(12) United States Patent
Obrecht

(10) Patent No.: US 8,516,899 B2
(45) Date of Patent: Aug. 27, 2013

(54) SYSTEM FOR REMOTE MONITORING OF AERODYNAMIC FLOW CONDITIONS

(75) Inventor: John M. Obrecht, Lafayette, CO (US)

(73) Assignee: Siemens Energy, Inc., Orlando, FL (US)

( * ) Notice: Subject to any disclaimer, the term of this patent is extended or adjusted under 35 U.S.C. 154(b) by 475 days.

(21) Appl. No.: 12/898,769

(22) Filed: Oct. 6, 2010

(65) Prior Publication Data

US 2012/0086209 A1   Apr. 12, 2012

(51) Int. Cl.
  *G01F 1/00*   (2006.01)
(52) U.S. Cl.
  USPC .......................................................... 73/861
(58) Field of Classification Search
  USPC ................... 73/861; 290/44; 412/61
  See application file for complete search history.

(56) References Cited

U.S. PATENT DOCUMENTS

| | | | |
|---|---|---|---|
| 2,716,228 A | | 8/1955 | Greene |
| 4,116,405 A | * | 9/1978 | Bacchi et al. ............... 244/12.4 |
| 4,691,879 A | * | 9/1987 | Greene ....................... 244/45 R |
| 5,117,687 A | | 6/1992 | Gerardi |
| 6,279,393 B1 | | 8/2001 | McLaughlin |
| 6,308,913 B1 | * | 10/2001 | Fujino et al. ............... 244/45 R |
| 6,526,821 B1 | | 3/2003 | Corda et al. |
| 6,568,260 B2 | | 5/2003 | Hakenesh |
| 7,117,735 B2 | | 10/2006 | Shoemaker et al. |
| 7,400,054 B2 | * | 7/2008 | Wesselink ....................... 290/44 |
| 7,730,776 B2 | | 6/2010 | Cornett et al. |
| 7,896,614 B2 | * | 3/2011 | Fisher ............................. 416/61 |
| 7,918,415 B2 | * | 4/2011 | de la Cierva Hoces ....... 244/7 R |
| 2007/0159346 A1 | | 7/2007 | Wesselink |
| 2009/0027168 A1 | | 1/2009 | Tuttle |
| 2009/0311096 A1 | | 12/2009 | Herr et al. |
| 2010/0143129 A1 | | 6/2010 | Fisher |

FOREIGN PATENT DOCUMENTS

| | | |
|---|---|---|
| DE | 4443665 A1 | 6/1996 |
| GB | 354381 | 8/1931 |
| GB | 660854 | 11/1951 |
| GB | 702289 | 1/1954 |
| GB | 2466433 A | 6/2010 |
| WO | 9744674 A1 | 11/1997 |

* cited by examiner

*Primary Examiner* — Jewel V Thompson

(57) ABSTRACT

A system (1) for monitoring aerodynamic flow conditions over an aerodynamic member is provided. The system (1) includes a cantilevered arm (16) having a first conductive lead (18) configured for movement relative to a second conductive lead (20) for selective contact therewith in alternative response to a presence or absence of a turbulent air (22) flow thereover. In addition, the system (1) includes a circuit (24) comprising the first conductive lead (18) and the second conductive lead (20). A continuity condition in the circuit (24) between the first conductive lead (18) and the second conductive lead (20) is indicative of the presence or absence of the turbulent air flow (22).

16 Claims, 4 Drawing Sheets

SYSTEM FOR REMOTE MONITORING OF AERODYNAMIC FLOW CONDITIONS

FIELD OF THE INVENTION

The present invention relates to monitoring aerodynamic flow conditions, and particularly to monitoring aerodynamic flow conditions over an aerodynamic member.

BACKGROUND OF THE INVENTION

Typically, wind turbines include a rotor having a plurality of rotor blades mounted thereon; a drive train and a generator housed in a nacelle; and a tower. The nacelle and the rotor are typically mounted on top of the tower. In operation, the plurality of blades of the rotor receive energy from the wind and convert the wind energy into a rotational torque that is used to drive one or more generators that are rotationally coupled to the rotor through the drive train. In an effort to increase the efficiency of the wind turbine, the boundary layer of the air flow at the blade (aerodynamic member) surface and the air flow around the blade surface may be monitored. Ideally, the air flow over the blade surface is uniform and attached. In contrast, when the flow over the aerodynamic member is chaotic and turbulent, the efficiency of the associated system may be substantially decreased. Known systems for monitoring aerodynamic conditions either: a) require the application and removal of a viscous liquid, which is used as a single-use monitoring system; or b) require interpretation from video monitoring systems and/or photographic images, which are computationally costly and complicated to interpret.

BRIEF DESCRIPTION OF THE DRAWINGS

The invention is explained in the following description in view of the drawings that show.

DETAILED DESCRIPTION OF THE INVENTION

In accordance with one aspect of the present invention, there are systems, methods, and devices for monitoring the aerodynamic flow over a substrate, e.g., an aerodynamic member. Exemplary aerodynamic members include the rotor blades of helicopters or wind power stations, or airplane wings. Advantageously, the systems, methods, and devices described herein provide real-time sensory information representing the aerodynamic state of flow over the substrate, which can thereafter be utilized to pinpoint problem areas on the substrate and improve efficiency of the substrate within its aerodynamic system. Advantageously, the present invention eliminates use of expensive devices, e.g., slip rings, to provide continuous, real time aerodynamic flow information to associated data acquisition programs. In addition, as will be explained below, a plurality of aerodynamic sensors may be deployed over an aerodynamic member without disturbing the air flow over the aerodynamic member.

Figure 1:
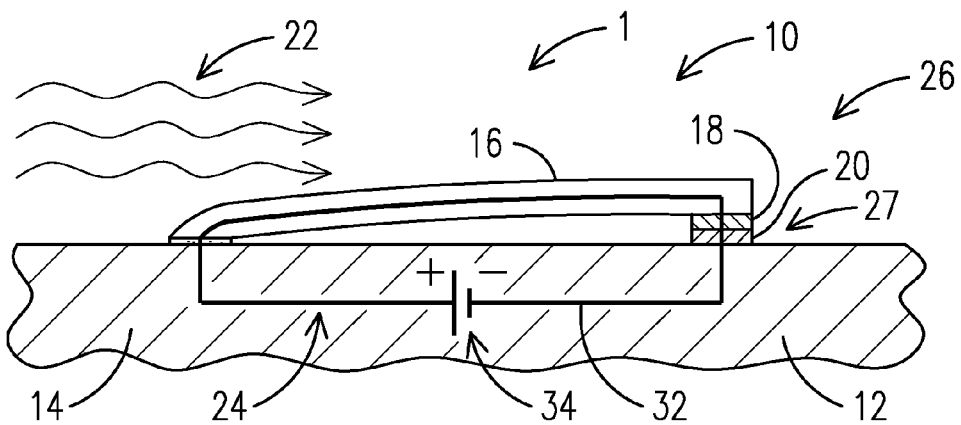
FIG. 1 illustrates an embodiment of an aerodynamic sensor in a closed position in accordance with an aspect of the present invention.

Now referring to FIG. 1, FIG. 1 illustrates a first embodiment of a system 1 including an aerodynamic sensor 10 (hereinafter "sensor 10") for determining the aerodynamic state of flow over a substrate 12, e.g., an aerodynamic member 14 such as an airplane wing or a wind turbine blade. The sensor 10 comprises a cantilevered arm 16 that is configured for attachment to the substrate 12, e.g., aerodynamic member 14, by any suitable structure or method as set forth below. The cantilevered arm 16 includes a first conductive lead 18 configured for movement relative to a second conductive lead 20 for selective contact therewith in alternative response to the presence or absence of a turbulent air flow 22 over the cantilevered arm 16. For exemplary purposes, FIG. 1 illustrates a turbulent flow 22 over the sensor 10. In one embodiment, the cantilevered arm 16 is configured for downward movement relative to the second conductive lead 20 in response to the turbulent air flow 22 over the sensor 10. However, it is understood that the present invention is not limited to the configuration shown in FIG. 1 and that the cantilevered arm 16 (including the first conductive lead 18) may move relative to the second conductive lead 20, or vice-versa, in any other suitable configuration.

Figure 2:
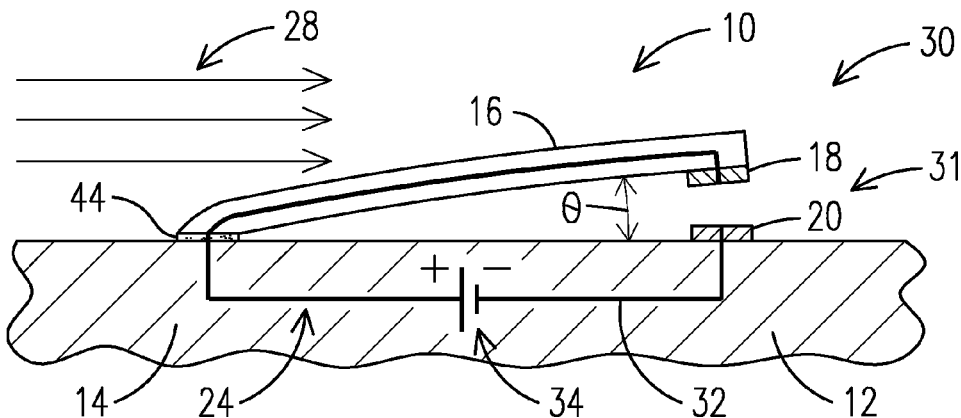
FIG. 2 illustrates an embodiment of an aerodynamic sensor in an open position in accordance with an aspect of the present invention.

The system 1 further includes an electric circuit 24 that comprises the first conductive lead 18 and the second conductive lead 20. In particular, the contact between the first conductive lead 18 and the second conductive lead 20 closes or completes the circuit 24 for the sensor 10, which is otherwise in an open position. In this way, a continuity condition in the circuit 24 between the first conductive lead 18 and the second conductive lead 20 is indicative of the presence or absence of the turbulent air flow 22 over the sensor 10. For example, in the presence of the turbulent air flow 22 over the sensor 10, the cantilevered arm 16 is configured to move relative to the second conductive lead 20 such that the first conductive lead 18 of the cantilevered arm 16 contacts the second conductive lead 20 as shown in FIG. 1. In this way, the circuit 24 is in a closed position 26 forming a closed circuit 27 as shown in FIG. 1. Typically, when the sensor 10 is disposed on the substrate 12 and the turbulent flow 22 moves over the sensor 10, the contact between the first conductive lead 18 and the second conductive lead 20 will be intermittent. Alternatively, as shown in FIG. 2, in the presence of uniform (attached) flow 28 over the cantilevered arm 16, the cantilevered arm 16 will not move relative to the second conductive lead 20 to a degree sufficient for the first conductive lead 18 and the second conductive lead 20 to contact one another. In this way, the circuit 24 will be in an open position 30 and will define an open circuit 31. One skilled in the art will appreciate that, in various embodiments, alternative contact or lack of contact between the conductive leads may result from turbulent flow, non-turbulent flow, or a lack of flow over the sensor as preferred by the designer for a particular application.

Each of the first conductive lead 18 and the second conductive lead 20 may be formed from a suitable electrically conductive material, such as copper, tin, or an alloy of copper and tin (e.g., brass). The cantilevered arm 16 is comprised of a relatively rigid material having a suitable thickness such that the first conductive lead 18 of the cantilevered arm 16 will not contact the second conductive lead 20 when the uniform flow 28 travels over the sensor 10. However, the cantilevered arm 16 has a suitable degree of flexibility due to its composition and/or thickness such that when the turbulent flow 22 travels over the cantilevered arm 16 and the sensor 10, the cantilevered arm 16 moves relative to the second conductive lead 20. In addition, the cantilevered arm 16 is preferably formed from a sufficiently rigid material so as to prevent torsional twisting of the cantilevered arm 16 when an air flow travels over the cantilevered arm 16. Preferably also, it is desirable that the cantilevered arm 16 be formed from a non-corrosive and temperature-resistant material as it expected that the sensor 10 will often be used in outdoor environments, e.g., on wind turbine blades or airplane wings. In one embodiment, the cantilevered arm 16 comprises a plastic material, such as polyurethane, polyethylene, polystyrene, polyvinyl chloride, polytetrafluoroethylene (PTFE), or combinations thereof. In another embodiment, the cantilevered arm 16 comprises a relatively rigid material that is also an electrically conductive material. Thus, in one embodiment, the cantilevered arm 16 and the first conductive lead 18 may be of the same material. In this way, the cantilevered arm 16 and the first conductive lead 18 may be integrally formed during manufacture.

The substrate 12 may be any suitable structure having an air flow traveling thereover, such as an aerodynamic member 14. According to particular aspects of the present invention, the aerodynamic member 14 may be a wind turbine blade, a rotor blade of a helicopter, or a wing of an airplane, for example. Typically, the aerodynamic member 14 has an airfoil, which is shaped such that the air rushing over the top speeds up and stretches out. This decreases the air pressure above the aerodynamic member. Conversely, air flowing below the aerodynamic member tends to move in a straighter line such that its speed and air pressure remain the same. It is noted, however, that the aspects of the present invention are not limited to use with an aerodynamic member and that the sensors described herein may be utilized in any environment to determine aerodynamic flow conditions over a substrate.

Referring again to FIG. 1, in one embodiment, the first conductive lead 18 is in electrical communication with the second conductive lead 20 via electrical wiring 32. Alternatively, the first conductive lead 18 may be in electrical communication with the second conductive lead 20 via any other suitable structure for providing the closed circuit 27 when the first conductive lead 18 and the second conductive lead 20 are in contact with one another. In one embodiment, as shown in FIG. 1, there is a local power supply 34 in electrical communication with at least with one of the first conductive lead 18 and the second conductive lead 20 to provide power to the circuit 24. The local power supply 34 may comprise a battery, a photovoltaic cell, or the like as is known in the art. In another embodiment, power may be provided for the circuit 24 from an external power source via any device that transmits energy to the sensor, such as a transponder reader, as set forth below.

Figure 3:
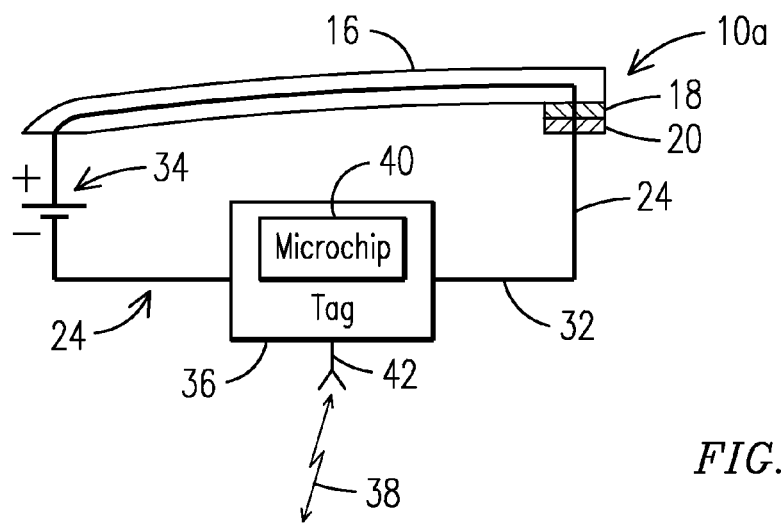
FIG. 3 illustrates another embodiment of an aerodynamic sensor having a transponder tag in accordance with an aspect of the present invention.

Referring to FIG. 3, there is shown another embodiment of a sensor 10a in accordance with the present invention that further comprises a transponder tag 36. The transponder tag 36 is in electrical communication (by wiring 32 or any other suitable structure) with the first conductive lead 18 or the second conductive lead 20 for receiving and/or transmitting a signal 38 from the sensor 10a. In addition, the transponder tag 36 may be in electrical communication with a power source, e.g., local power source 34, or may be in electrical communication with a remote power source, such as a transponder reader as described below that directs wave energy to the transponder tag 36 to supply the requisite power for the transponder tag 36 (and the sensor 10a). Critically, the transponder tag 36 may be manufactured to be integral with the sensor 10a to identify and track the sensor 10a, as well as transmit a signal having information representative of an aerodynamic state of the identified sensor 10a. In one embodiment, each transponder tag 36 is tuned to emit a signal, e.g., signal 38, having a predetermined frequency to identify the particular transponder tag 36. In addition, the signal 38 may include information representative of binary information, such as whether the circuit 24 is open or closed (thus whether there is turbulent or attached flow over the sensor). Further, the signal 38 may include information representative of one or more physical or electrical properties of the sensor 10 or the air flow over the sensor 10, such as the capacitance between the first conductive lead 18 and the second conductive lead 20.

In one embodiment, the transponder tag 36 is configured to transmit the signal 38 when a particular continuity condition in the circuit is present, e.g., when the circuit 24 is in the closed position 26. The transponder tag 36 may be any suitable device configured for transmission of the signal 38 and optionally data storage. In one embodiment, as shown in FIG. 3, the transponder tag 36 comprises a microchip 40 for storing and processing information, modulating and demodulating a signal, e.g., a radio-frequency (RF) signal, having a predetermined wavelength, and other specialized functions. For example, the microchip 40 may transmit, store, and process any information that identifies the particular sensor and information representative of the aerodynamic flow conditions over the sensor, or any other desired information. In addition, the transponder tag 36 comprises an antenna or transceiver 42 for receiving and/or transmitting a signal, e.g., signal 38. In one embodiment, when the first conductive lead 18 contacts the second conductive lead 20, the circuit 24 is in the closed position 26 and the transponder tag 36 transmits a signal 38 from the transceiver 42 of the transponder tag 36. The transmittance or presence of the signal 38 may itself be indicative of whether there is a turbulent flow 22 or a uniform flow 28 over the sensor 10. As will be explained below, the transceiver 42 may automatically transmit the signal 38 to a suitable reader device or may transmit the signal in response to an interrogation from a suitable device, e.g., a transponder reader.

The transponder tag 36 may comprise one of more of an active tag, a passive tag, a semi-active tag, and a battery assisted (BAP) tag, for example. Active tags contain a power source, e.g., local power source 34, as described above as shown above and can transmit signals autonomously. Passive tags, on the other hand, do not include a local power source, but are able to capture electromagnetic energy (via an antenna or the like) produced by a near-by exciter and utilize that energy to emit a unique code. The small amount of electrical current induced in the transceiver 42 (or antenna) of the transponder tag 36 by the incoming signal provides just enough power for the microchip 40 in the transponder tag 36 to power up the sensor 10 and transmit a response. Semi-active tags may be similar to passive tags except for the addition of a local or nearby power source. Battery assisted passive (BAP) tags require an external energy source to wake up, but then may transmit a signal autonomously. The systems as described herein may include any one or more of these types of tags and the present invention is not intended to be limited by the type of tag utilized. The term transponder tag is meant herein to include devices which respond only when interrogated, as well as devices which remain active whenever powered regardless of external interrogation.

In a particular embodiment, the transponder tag 36 is a RFID tag of a type set forth above (active, passive, semi-active, etc.). Exemplary RFID tags (including their structure and operation) are set forth in U.S. Published Patent Application No. 2009/0027168, the entirety of which is hereby incorporated by reference. Alternatively, the transponder tag 36 may be any other tag device that enables a signal, e.g., signal 38, to be received and/or transmitted from the transponder tag 36. In another embodiment, the transponder tag 36 may be an optical tag that uses a different frequency from RFID tags, such as frequencies in the infrared or ultraviolet range. Further alternatively, the transponder tag 36 may be any other tag configured to receive and/or transmit a signal in the electromagnetic spectrum.

The components of the system, namely the cantilevered arm 16 having the first conductive lead 18, the second conductive lead 20, power supply 34 (if present), and any other structures necessary for electrical communication between the components, e.g., wiring 32, may be permanently or removably secured to a desired substrate 12, such as a surface of an aerodynamic member 14. In one embodiment, as shown in FIG. 2, the components of the system are individually attached to the substrate 12. For example, the cantilevered arm 16 having the first conductive lead 18 is secured to the substrate 12 at an end thereof by any suitable method, such as soldering, or by any suitable structure, such as an adhesive, e.g., adhesive 44, fasteners, or the like. The second conductive lead 20 may be similarly secured to the substrate 12 by any suitable method, such as soldering, or by any suitable structure, such as an adhesive, e.g., adhesive 44, fasteners, or the like. The second conductive lead 20 is positioned such that the second conductive lead 20 may contact with the first conductive lead 18 in the presence of particular aerodynamic conditions. Any of the other components of the sensor 10, if present, can similarly be permanently or removably attached to the substrate by any suitable method, such as soldering, or by any suitable structure, such as an adhesive, e.g., adhesive 44, fasteners, or the like. These additional components, include but are not limited to, the transponder tag 36, the local power supply 34, and any suitable electrical connections, e.g., wiring 32, between components.

When disposed on the substrate 12, the cantilevered arm 16 is disposed at a relatively small angle θ relative to the substrate 12, as shown in FIG. 2, such that when air flow over the sensor 10 is a uniform flow 28, the first conductive lead 18 is not in contact with the second conductive lead 20. Conversely, when the air flow over the sensor 10 is chaotic or turbulent (turbulent flow 22), the relatively small angle (θ) renders it likely that the first conductive lead 18 will contact the second conductive lead 20. In this instance, the circuit 24 will be in the closed position 26 as shown in FIG. 1. In addition, the relatively small angle (θ) prevents significant disturbances to the air flow over the substrate. In one embodiment, the angle (θ) of the cantilevered arm 16 relative to the substrate 12 on which the sensor 10 is disposed is 15° or less. When the transponder tag 36 is included in a sensor as described herein, e.g., sensor 10 or 10*a*, the transponder tag 36 may be configured to transmit the signal 38 automatically at a predetermined time or time interval or upon query from an external source. In a particular embodiment, the transponder tag 36 is configured to transmit the signal 38 automatically when the circuit 24 is in the closed position 26. Alternatively, the transponder tag 36 will transmit the signal 38 upon interrogation from a suitable reading device as set forth below.

Figure 4:
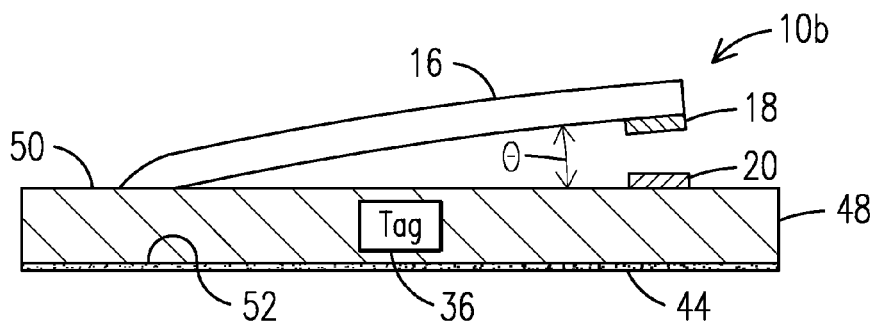
FIG. 4 illustrates another embodiment of an aerodynamic sensor disposed on a backing member in accordance with an aspect of the present invention.

Now referring to FIG. 4, FIG. 4 shows another embodiment of a sensor in accordance with an aspect of the present invention. The sensor 10*b* may include the same components as set forth above in FIGS. 1-3, including the electrical circuitry components, but the sensor 10*b* is in the form of an integrated sensor whose components are instead mounted on a backing member 48 that can easily be attached to or removed from the substrate 12 without damaging the substrate 12 to which it is attached. Further advantageously, the sensor 10*b* can be placed on a substrate 12, e.g., an aerodynamic member 14, without significantly changing the flow dynamics over the aerodynamic member 14. As shown in FIG. 4, the sensor 10*b* comprises a base member 48 having a top side 50 and a bottom side 52. The cantilevered arm 16 having the first conductive lead 18 thereon extends from the top side 50 of the base member 48 at a desired angle θ, which may be 15° or less. The second conductive lead 20 is disposed on the top side 50 of the base member 48 such that when the first conductive lead 18 may alternatively move relative to the second conductive lead 20 depending on the aerodynamic flow conditions over the sensor 10*b*.

When present, the transponder tag 36 as described above may be disposed on or adjacent the backing member 48 at any suitable location on the sensor 10*b*, such as on a side of the base member 48 as shown or, for example, on the top side 50 of the base member 48. Any suitable structures for providing electrical communication between the components, e.g., wiring 32, may also be secured to the backing member 48 if desired. In addition, if a local power source is utilized, the local power source 34 may further be disposed on the backing member 48 at a desired position. In one embodiment, the bottom side 52 of the backing member 48 may include an adhesive 44 such that the sensor 10*b* may be placed on an aerodynamic member 14, for example, without damaging the aerodynamic member 14. Alternatively, the sensor 10*b* may be attached to the substrate 12 by any other suitable structure or method, such as soldering, fittings, and the like. The sensor 10*b* may also be of any suitable size and shape. In one embodiment, the sensor 10*b* is manufactured such that its overall profile is very thin (e.g., 1-2 mm in thickness). In this way, the sensor 10*b* may be made on a scale on the order of the aerodynamic boundary layer over the substrate 12.

Figure 5:
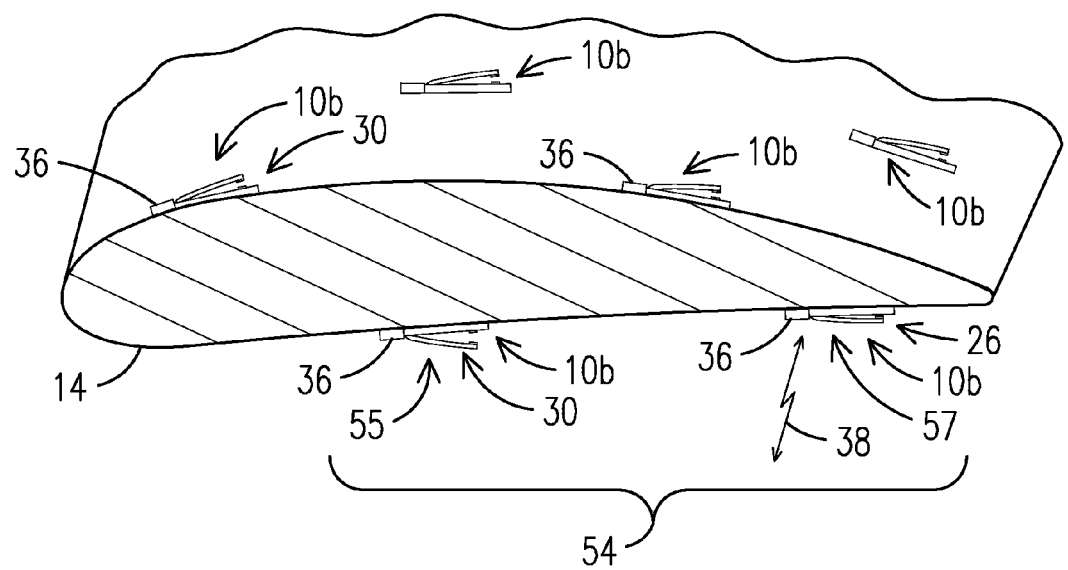
FIG. 5 is an end view of an aerodynamic member having a plurality of aerodynamic sensors thereon taken at line 5-5 of FIG. 6 in accordance with an aspect of the present invention.

As shown in FIG. 5, a plurality of any of the aerodynamic sensors described herein, such as sensors 10*b*, may be disposed across a substrate 12, such as an aerodynamic member 14 on one or both sides of the substrate 12 as is appropriate. FIG. 5 is an end view of an aerodynamic member 14, e.g., rotor blade 106 taken at line 5-5 of FIG. 6. The sensors 10*b* may be disposed at any desired position on the aerodynamic member 14 in spaced apart relationship to determine the state of the air flow over a length of the aerodynamic member 14. In one embodiment, the sensors, e.g., sensors 10*b*, are positioned such that each sensor 10*b* is not located directly downstream from an upstream sensor 10*b*. In this way, the sensors 10*b* are scattered or arranged along the substrate 12 such that each sensor 10*b* is contacted by an undisturbed air flow.

In the exemplary embodiment shown, each sensor 10*b* includes the transponder tag 36 and is capable of transmitting the signal 38 comprising unique identifying information and information about the aerodynamic flow over an associated sensor 10*b* to a suitable reading device as set forth below. In this way, one may determine a region 54 on the aerodynamic member 14 where flow is moving from a uniform flow 28 to a turbulent flow 22, for example. The identification of such a region 54 where an air flow turns from the uniform flow 28 to the turbulent flow 22 may lead to a modification of the aerodynamic member 14 or to an inspection of the aerodynamic member 14 to determine the source of the change to turbulent flow 22. For example, there may be debris disposed on the aerodynamic member 14 causing the change to turbulent flow 22 within the particular region 54. For example, one may be able to determine via transmittal and processing of the signal 38 from the transponder tag 36 of each sensor 10b that a particular sensor 10b, shown also by numeral 55, disposed on the aerodynamic member 14 has a uniform flow 28 thereover due to the first conductive lead 18 and the second conductive lead 20 not being in contact with one another and defining the open position 30. In addition, one may be able to determine via transmittal and processing of the signal 38 from the transponder tag 36 of the sensors 10b that an adjacent sensor 10b, shown by numeral 57, has a turbulent flow 22 thereover due to the first conductive lead 18 and the second conductive lead 20 being in contact with one another and defining the closed position 26.

Figure 6:
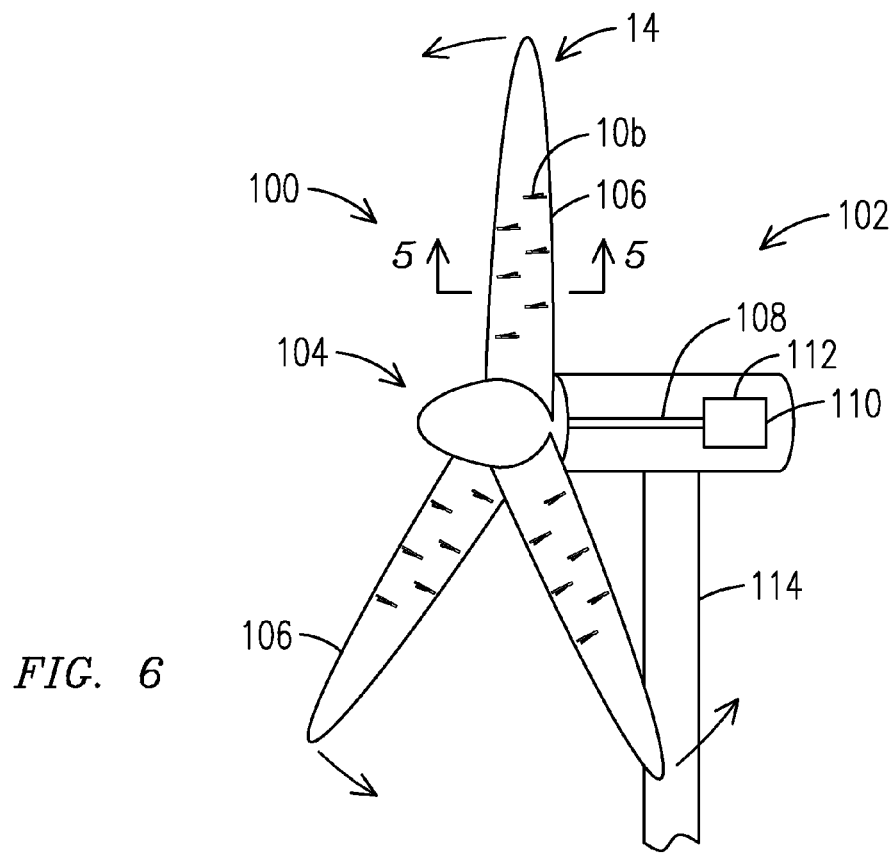
FIG. 6 illustrates an embodiment of a system having a plurality of sensors for determining the aerodynamic flow over an aerodynamic member in accordance with an aspect of the present invention.

In a particular embodiment, as shown in FIG. 6, the aerodynamic member 14 is a rotor blade within a wind turbine system 100. The wind turbine system 100 comprises a wind turbine 102 that includes a rotor 104 having multiple blades 106 thereon, a rotatable shaft 108 and an electrical generator 110 housed in a nacelle 112, and a tower 114. Each blade 106 may define an aerodynamic member 14 as described herein. The nacelle 112 and the rotor 104 are typically mounted on top of the tower 114. Each blade 106 is associated with the rotatable shaft 108 to power the electrical generator 110 in response to an air flow, e.g., turbulent flow 22 or uniform flow 28, which causes rotation of the blades 106. A plurality of aerodynamic sensors as described herein, e.g., sensors 10b, are disposed across the blade 106. Each sensor 10b is associated with a transponder tag 36, e.g., a radio-frequency identification tag, and is effective to produce a respective signal, e.g., signal 38, indicative of an alternative presence or absence of turbulence in the air flow at a location of the respective sensor 10b.

Figure 7:
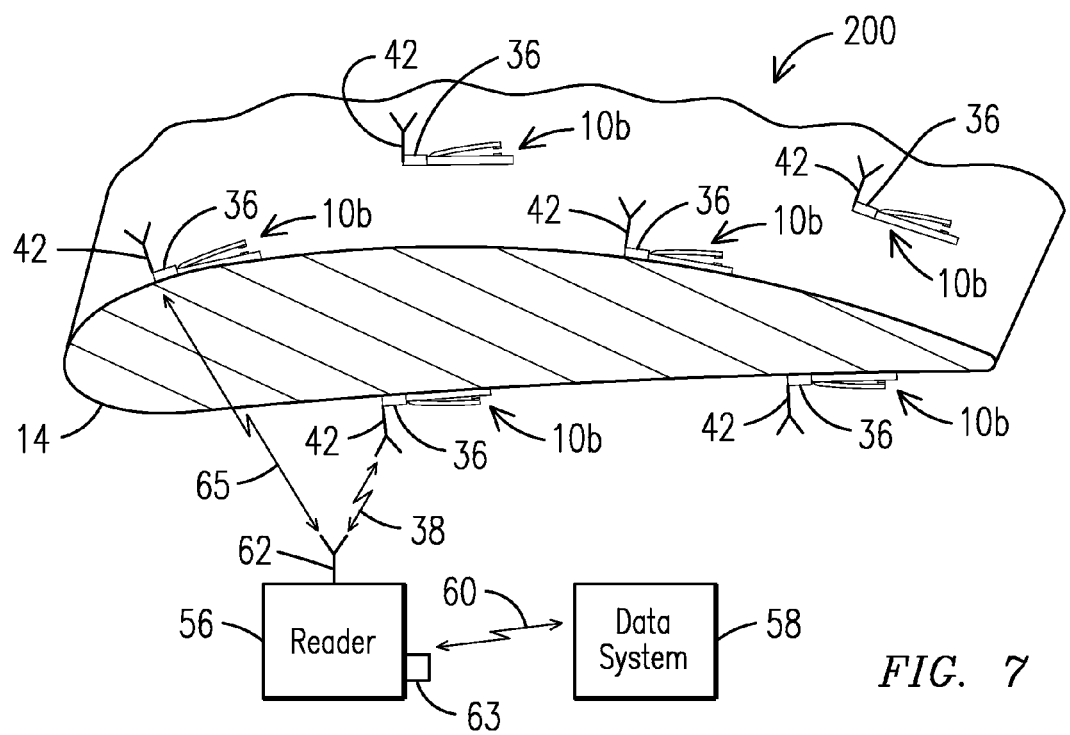
FIG. 7 illustrates another embodiment of a system for determining the aerodynamic flow over a substrate in accordance with an aspect of the present invention.

Referring now to FIG. 7, FIG. 7 shows a plurality of sensors as described herein, e.g., sensors 10b also having a transponder tag 36, which may be part of a system 200 that also includes a transponder reader 56 for transmitting a signal to and/or receiving the signal 38 directly or indirectly from any of the sensors 10b. Further, the system 200 may include a data acquisition system 58 in communication with the transponder reader 56 over a network 60 or the like via a wireless communication device 63 on the reader 56. The reader 56 may be any suitable transponder reading device known in the art for communicating with the sensors 10b individually or collectively, or via an intermediate device over the network 60. Typically, the reader 56 includes at least a transceiver 62 for transmitting a signal and/or receiving a signal, e.g., the signal 38, from the sensors 10b. The sensors 10b may be disposed on any suitable substrate, such as an aerodynamic member 14 with the wind turbine system 100 described above.

The network 60 established between the reader 56 and the data acquisition system 58 to communicate computer readable information may be any type of known wireless network including a local area network (LAN), wide area network (WAN), a global network (e.g., Internet), an intranet, an extranet, or the like. In one embodiment, the network 60 is a wireless local area network (WLAN). As an example, the WLAN may be based on an 802.11 specification, otherwise known as "Wi-Fi" due to the fact that an organization called Wi-Fi Alliance provides certification for products that conform to 802.11. The data acquisition system 58 typically comprises at least a processor, network interface, input device and a memory associated with the data acquisition system 58. Within the memory, there are stored unique identification codes corresponding to the individual sensors (e.g. sensors 10, 10a, or 10b) and any other desired information necessary to process the information received from the sensors.

Figure 8:
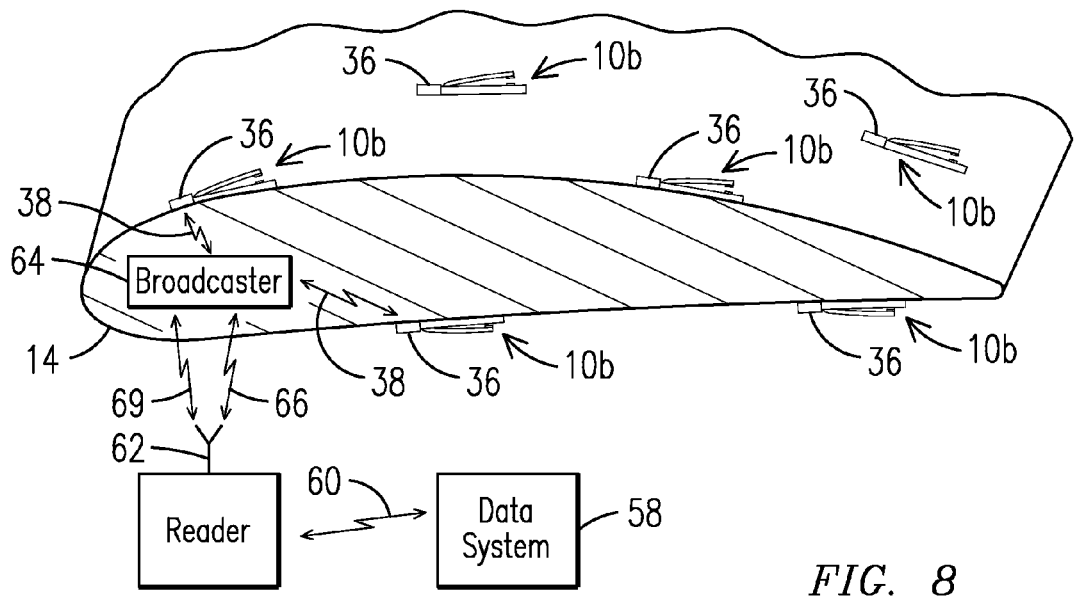
FIG. 8 illustrates yet another embodiment of a system for determining the aerodynamic flow over a substrate in accordance with an aspect of the present invention.

In one embodiment, as shown in FIG. 7, the reader 56 may communicate directly with the sensors 10b via its transceiver 62 as shown by signal 65, which may power and/or query the sensor 10b. In another embodiment, as shown in FIG. 8, sensors, e.g., sensors 10b, on the substrate 12, e.g., aerodynamic member 14, may communicate with the reader 56 through an intermediate relay device, e.g., a broadcaster 64. The broadcaster 64 is configured to receive the signal 38 from one or more of the sensors 10b and relay a signal 66 to the reader 56 or alternatively to the data acquisition system 58 over the network 60. In one embodiment, the broadcaster 64 is also configured to transmit a signal 69 to the broadcaster 64 to energize the broadcaster 64 or sensors 10b and/or request the signal 38 be sent from the sensors 10b. The broadcaster 64 is particularly useful for an embodiment of the system 200 having semi-active transponder tags 36. In this way, the transponder tags 36 themselves may be passive tags, which do not require a local power supply. The broadcaster 64, on the other hand, may include a power supply and handle transmission of energy or information from the components of the system 100, e.g., between the broadcaster 64 and the reader 56. In this way, only one power supply will need to be maintained versus a plurality of power supplies if each sensor 10b had to include its own local power supply.

When the transponder tag 36 is a passive or semi-active transponder tag, the transceiver 62 (or other additional device) of the reader 56 may also be configured to energize each of the transponder tags 36. In this case, when the reader 56 is within close proximity to respective transponder tags 36 of the sensors, e.g., sensor 10b, the reader 56 transmits the signal 65 to the transceiver 42 of the transponder tag 36 to thereby power the sensor 10b and allow the sensor 10b to transmit the signal 38 to the reader 56 as shown in FIG. 7 or the broadcaster 64 as shown in FIG. 8. Similar to the signal 38 described above, the signal 66 from the broadcaster 64 may contain information representative of a unique code identifying an associated sensor 10b and may include information representative of physical properties on or about each sensor 10b, e.g., a capacitance measurement or whether the circuit 24 is in the closed position 26 or in the opened position 30. In the embodiments described above, either the broadcaster 64 or the transponder tag 36 may be configured to transmit a signal, e.g., signal 38 or 66, which is received by the transceiver 62 of the reader 58 at predetermined times, intervals, or in response to a particular measurement, condition or the like, such as a predetermined capacitance, resistance, or the presence of a closed circuit, e.g., closed circuit 27, as described herein.

Figure 9:
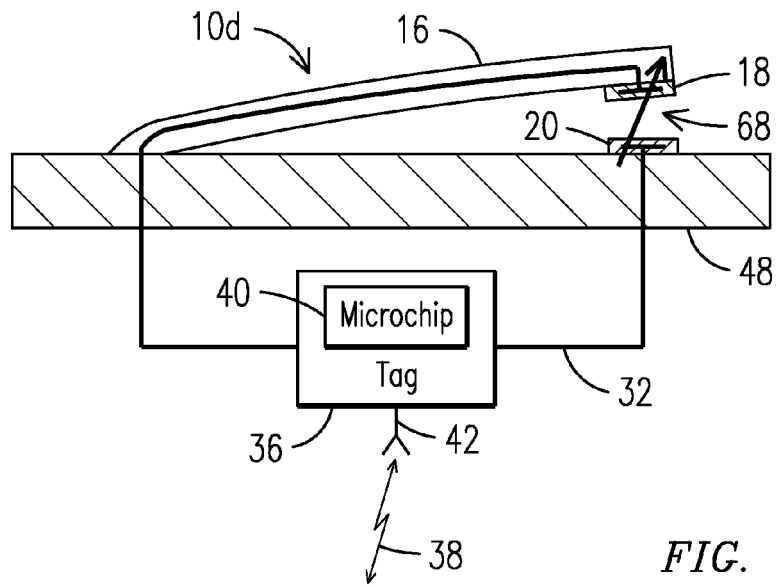
FIG. 9 illustrates an embodiment of an aerodynamic sensor capable of measuring a capacitance between two leads in accordance with an aspect of the present invention.

The above-described embodiments principally describe the usefulness of determining whether a particular sensor as described herein is in an open or a closed position. As noted above, the open position indicates a uniform flow over the sensor, whereas a closed position indicates a turbulent flow over the sensor. It is appreciated, however, that aspects of the present invention are not limited to the providing of binary (open or closed) information only. It is contemplated that the sensors as described herein may instead be configured to measure a physical property, e.g., capacitance or resistance between the first conductive lead 18 and the second conductive lead 20, which will give an indication as to the degree of uniform or attached flow. By way of example only, as shown in FIG. 9, a sensor 10*d* itself acts as a capacitor for small separations (or small angles) between the first conductive lead 18 and the second conductive lead 20, and the capacitance between 18 and 20 will vary with separation between the first conductive lead 18 and the second conductive lead 20. The capacitance information can be transmitted through small modulations to the carrier frequency of the sensor's radiofrequency signal akin to a capacitor in a broadcast system. To accomplish this, the sensor 10*d*, including the first conductive lead 18 and the second conductive lead 20, may also be configured as an oscillator or variable capacitor 68 such that an output frequency of the transponder tag 36 is dependent on the degree of capacitance between the first conductive lead 18 and the second conductive lead 20.

In another embodiment, the sensor 10*d* may comprise a measuring device, such as a capacitance measuring device or a voltage measuring device that is in electrical communication with the first conductive lead 18 and/or the second conductive lead 20 for directly or indirectly measuring the capacitance therebetween. In this embodiment, the transceiver 42 of the transponder tag 36 may also be in communication with the measuring device to obtain or receive collected information from the capacitance measuring device to a suitable receiving device, e.g., reader 56 or the broadcaster 64 as described herein, for example.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A system for monitoring aerodynamic flow conditions over an aerodynamic member comprising:
   a cantilevered arm comprising a first conductive lead configured for downward movement relative to a second conductive lead for selective contact therewith in response to a presence of a turbulent air flow there over; and
   a circuit comprising the first conductive lead and the second conductive lead;
   wherein a continuity condition in the circuit between the first and second conductive leads is indicative of the presence of the turbulent air flow.

2. The system of claim 1, wherein the circuit further comprises a transponder tag configured to produce a respective signal indicative of the presence of the turbulent air flow in response to the selective contact between the first conductive lead and the second conductive lead.

3. The system of claim 2, wherein the transponder tag comprises a radio- frequency tag.

4. The system of claim 1, wherein the cantilevered arm comprises at least one of copper, tin, or an alloy thereof.

5. The system of claim 1, wherein the cantilevered arm comprises a polymeric material, and wherein the first conductive lead comprises at least one of copper, tin, or an alloy thereof.

6. The system of claim 1, further comprising a base member having a top side and a bottom side, wherein the cantilevered arm extends from the top side of the base member at a predetermined angle, and wherein the second conductive lead is disposed on the top side of the base member.

7. The system of claim 6, wherein the cantilevered arm comprises a range of motion of 15° or less from a first position where the first conductive lead is not in contact with the second conductive lead to a second position where the second conductive member is in contact with the second conductive lead to define the continuity condition, and wherein the bottom side of the base member comprises an adhesive for attaching the system to the aerodynamic member.

8. The system of claim 1, wherein the system comprises a variable capacitor configured to measure a capacitance value dependent upon a degree of separation between the first conductive lead and the second conductive lead.

9. An aerodynamic member comprising the system of claim 1.

10. The aerodynamic member of claim 9, wherein the aerodynamic member comprises a wing of an airplane.

11. The aerodynamic member of claim 9, wherein the aerodynamic member comprises a rotor blade of a wind turbine.

12. A system for monitoring aerodynamic flow conditions over a wind turbine blade of a wind turbine comprising:
    a wind turbine blade;
    an aerodynamic sensor disposed on the blade, the aerodynamic sensor associated with a transponder tag effective to produce a signal indicative of an alternative presence or absence of turbulence in an air flow over the blade at a location of the sensor; and
    a remote reader unit configured to directly or indirectly receive the signal from the transponder tag at a location remote from the wind turbine.

13. The system of claim 12, wherein the reader unit is configured to receive the signal indirectly from the transponder tag via a broadcaster unit in communication between the transponder tag and the reader unit.

14. The system of claim 12, wherein the reader unit comprises a wireless communication device for transmitting data collected by the reader unit to a data acquisition system over a computer network.

15. A method for monitoring aerodynamic flow conditions over an aerodynamic member comprising:
    disposing a plurality of sensors across an aerodynamic member associated with a rotatable shaft for powering an electrical generator in response to an air flow over the aerodynamic member, wherein each sensor comprises;
    a cantilevered arm comprising a first conductive lead configured for downward movement relative to a second conductive lead for selective contact therewith in response to a presence of a turbulent air flow there over; and
    a circuit comprising the first conductive lead and the second conductive lead;
    wherein a continuity condition in the circuit between the first and second conductive leads is indicative of the presence of the turbulent air flow; and
    prior to a stall condition, determining the presence or an absence of the turbulent air flow over each of the plurality of sensors based upon a presence or absence of a continuity condition in the circuit between the first and second conductive leads.

16. The method of claim 15, further comprising determining a degree of turbulence over each of the plurality of sensors prior to a stall condition by measuring a physical property that is dependent upon a degree of separation between the first conductive lead and the second conductive lead.

* * * * *